(12) United States Patent
Sato et al.

(10) Patent No.: US 8,439,785 B2
(45) Date of Patent: May 14, 2013

(54) CONTROL APPARATUS FOR AUTOMATIC TRANSMISSION

(75) Inventors: Osamu Sato, Fujisawa (JP); Akio Nonomura, Numazu (JP); Hiromichi Akebono, Machida (JP)

(73) Assignee: Jatco Ltd, Fuji-shi (JP)

( * ) Notice: Subject to any disclaimer, the term of this patent is extended or adjusted under 35 U.S.C. 154(b) by 1009 days.

(21) Appl. No.: 12/481,058

(22) Filed: Jun. 9, 2009

(65) Prior Publication Data

US 2009/0312131 A1  Dec. 17, 2009

(30) Foreign Application Priority Data

Jun. 16, 2008  (JP) ................................. 2008-156224

(51) Int. Cl.
*F16H 61/06* (2006.01)

(52) U.S. Cl.
USPC .......................................... 475/128; 475/117

(58) Field of Classification Search ........................ None
See application file for complete search history.

(56) References Cited

U.S. PATENT DOCUMENTS

| | | | |
|---|---|---|---|
| 4,671,139 A | 6/1987 | Downs et al. | |
| 4,953,090 A | 8/1990 | Narita | |
| 5,795,265 A | 8/1998 | Domian et al. | |
| 5,857,935 A | 1/1999 | Takiguchi | |
| 5,947,856 A | 9/1999 | Tabata et al. | |
| 6,259,983 B1 | 7/2001 | Tsutsui et al. | |
| 6,508,736 B2 | 1/2003 | Saito | |
| 6,514,165 B2 | 2/2003 | Saito | |
| 6,543,593 B2 | 4/2003 | Saito | |
| 6,616,576 B2 | 9/2003 | Saito | |
| 7,912,614 B2 | 3/2011 | Honma et al. | |
| 2002/0034999 A1 | 3/2002 | Saito | |
| 2002/0035011 A1 | 3/2002 | Saito | |
| 2002/0103049 A1 | 8/2002 | Takatori et al. | |
| 2008/0039286 A1 | 2/2008 | Asami et al. | |

FOREIGN PATENT DOCUMENTS

| | | |
|---|---|---|
| DE | 198 54 624 A1 | 6/1999 |
| EP | 0 719 967 A1 | 7/1996 |
| EP | 0 900 957 A2 | 3/1999 |
| EP | 1 188 965 A2 | 3/2002 |
| JP | 04-254059 A | 9/1992 |

(Continued)

OTHER PUBLICATIONS

M. Suzuki, U.S. PTO Notice of Allowance, U.S. Appl. No. 12/487,120, dated Nov. 1, 2011, 12 pages.

(Continued)

*Primary Examiner* — David D Le
*Assistant Examiner* — Erin D Bishop
(74) *Attorney, Agent, or Firm* — Foley & Lardner LLP (57) ABSTRACT

An automatic transmission includes: a frictional engagement element arranged to be switched from an engagement state to a disengagement state at a switching from a running range to a neutral range, and including: frictional plates; a first piston arranged to push the frictional plates; a second piston arranged to push the frictional plates; a first hydraulic chamber arranged to receive a hydraulic fluid for pushing the first piston; and a second hydraulic chamber arranged to receive a hydraulic fluid for pushing the second piston; a first discharge speed switching section arranged to switch only a discharge speed of the hydraulic fluid of the first hydraulic chamber; and a control unit configured to increase the discharge speed of the hydraulic fluid of the first hydraulic chamber during a predetermined time period by the first discharge speed switching section at the switching from the running range to the neutral range.

8 Claims, 8 Drawing Sheets

FOREIGN PATENT DOCUMENTS

| | | |
|---|---|---|
| JP | 07-317892 A | 12/1995 |
| JP | 10-047464 A | 2/1998 |
| JP | 10-047469 A | 2/1998 |
| JP | 2000-110929 A | 4/2000 |
| JP | 2000-352459 | 12/2000 |
| JP | 2001-065682 A | 3/2001 |
| JP | 2002-089674 A | 3/2002 |

OTHER PUBLICATIONS

O. Sato, U.S. PTO Office Action, U.S. Appl. No. 12/487,025, dated Dec. 27, 2011, 8 pages.

U.S. Appl. No. 12/487,025, filed Jun. 18, 2009, Sato et al.

U.S. Appl. No. 12/487,120, filed Jun. 18, 2009, Suzuki et al.

O. Sato, U.S. PTO Notice of Allowance, U.S. Appl. No. 12/487,025, dated Mar. 16, 2012, 7 pages.

|   |     | B1  | C1 | C2 | C3  | B2 | B3 | B4 | F1 | F2 |
|---|-----|-----|----|----|-----|----|----|----|----|----|
|   | P   |     |    |    |     |    |    |    |    |    |
|   | Rev.| ○   |    |    | ○   |    |    | ○  |    |    |
|   | N   |     |    |    |     |    |    |    |    |    |
| D | 1st | (○) |    |    | (○) | ○  |    |    | ○  | ○  |
| D | 2nd |     |    |    | (○) | ○  | ○  |    |    | ○  |
| D | 3rd |     |    | ○  |     | ○  | ○  |    |    |    |
| D | 4th |     |    | ○  | ○   |    | ○  |    |    |    |
| D | 5th |     | ○  | ○  | ○   |    |    |    |    |    |
| D | 6th |     | ○  |    | ○   |    | ○  |    | ○  |    |
| D | 7th | ○   | ○  |    | ○   |    |    | ○  |    |    |

CONTROL APPARATUS FOR AUTOMATIC TRANSMISSION

BACKGROUND OF THE INVENTION

This invention relates to an automatic transmission for a vehicle, and more specifically to an automatic transmission arranged to switch gear stages by engagement/disengagement of frictional engagement elements.

An automatic transmission includes planetary gears and a plurality of frictional engagement elements. The automatic transmission is arranged to switch a transmitting path of a rotational torque by engagement/disengagement of the frictional engagement elements, and thereby to attain a plurality of gear stages. Each of the frictional engagement elements includes a piston within a hydraulic chamber. In the engagement of the frictional engagement element, each of the hydraulic chamber receives the hydraulic fluid, so that the corresponding piston is moved. In the disengagement, the hydraulic pressure is released from the hydraulic chamber. In this case, it is desired to perform the engagement/disengagement of the frictional engagement elements in a short time for the switching response (responsiveness). On the other hand, when the engagement and the disengagement are rapidly switched, the rapid variation of the torque is caused, and so that the shock is generated. In particular, at the switching from a running range to a neutral range, the vehicle is switched from a driving (running) state to a state in which the driving force is disappeared. Accordingly, the shock at the disengagement of the frictional engagement elements is notably felt in a relatively silent state in which the driving noise decreases.

Japanese Patent Application Publication No. 2000-352459 discloses an automatic transmission including an orifice switching device provided in a hydraulic control circuit to a frictional engagement element, and arranged to switch between a large orifice state and a small orifice state, and thereby to adjust the variation of the hydraulic pressure. The automatic transmission is arranged to switch the orifice switching device to the large orifice state at the switching from the running range to the neutral range, and thereby to increase the discharge speed of the hydraulic fluid from the frictional engagement element. After the predetermined time period has elapsed, the orifice switching device is switched to the small orifice state to suppress the shock by decreasing the discharge speed. The controller is configured to perform a learning control of the predetermined time period to hold the large orifice state based on a time period from the switching to the large orifice state to a start of generation of the variation of the rotational speed of a predetermined rotating element, and a time period from the switching to the small orifice state to a start of generation of the variation of the rotational speed of the rotating element.

SUMMARY OF THE INVENTION

However, in the conventional apparatus, it is necessary to perform the learning control of the time period to hold the large orifice state for ensuring the responsiveness, and attaining the shock prevention. Accordingly, there is a problem that the control is complicated.

It is, therefore, an object of the present invention to provide an automatic transmission devised to solve the above-mentioned problems, to prevent shock of a frictional engagement element disengaged at a switching from a running range to a neutral range, and to ensure the response of the disengagement, by a simple control process without a learning control.

According to one aspect of the present invention, an automatic transmission comprises: a frictional engagement element arranged to be switched from an engagement state to a disengagement state at a switching from a running range to a neutral range, the frictional engagement element including: frictional plates; a first piston arranged to push the frictional plates; a second piston arranged to push the frictional plates; a first hydraulic chamber arranged to receive a hydraulic fluid for pushing the first piston; and a second hydraulic chamber arranged to receive a hydraulic fluid for pushing the second piston; a first discharge speed switching section arranged to switch only a discharge speed of the hydraulic fluid of the first hydraulic chamber; and a control unit configured to increase the discharge speed of the hydraulic fluid of the first hydraulic chamber during a predetermined time period by the first discharge speed switching section at the switching from the running range to the neutral range.

According to another aspect of the invention, an automatic transmission comprises: a frictional engagement element arranged to be switched from an engagement state to a disengagement state at a switching from a running range to a neutral range, the frictional engagement element including: frictional plates; a first piston arranged to push the frictional plates; a second piston arranged to push the frictional plates; a first hydraulic chamber arranged to receive a hydraulic fluid for pushing the first piston; and a second hydraulic chamber arranged to receive a hydraulic fluid for pushing the second piston; a first discharge speed switching section arranged to switch only a discharge speed of the hydraulic fluid of the first hydraulic chamber; a second discharge speed switching section arranged to switch the discharge speed of the hydraulic fluid of the first hydraulic chamber and a discharge speed of the hydraulic fluid of the second hydraulic chamber; and a control section configured to control the discharge speed of the hydraulic fluid, to increase, to a first level, the discharge speed of the hydraulic fluid of the first hydraulic chamber and the discharge speed of the hydraulic fluid of the second hydraulic chamber by the second discharge speed switching section, from a start of the switching from the running range to the neutral range to a time at which a shift progression degree reaches a predetermined shift progression degree, when a temperature of the hydraulic fluid is equal to or higher than a third threshold value, to increase the discharge speed of the hydraulic fluid of the first hydraulic chamber by the first discharge speed switching section, during a predetermined time period from the start of the switching from the running range to the neutral range to a time before a start of a release of a transmission torque, when the temperature of the hydraulic fluid is equal to or higher than a second threshold value lower than the third threshold value, and lower than a first threshold value higher than the third threshold value, to increase, to a second level higher than the first level, the discharge speed of the hydraulic fluid of the first hydraulic chamber and the discharge speed of the hydraulic fluid of the second hydraulic chamber by the second discharge speed switching section, from the start of the switching from the running range to the neutral range to a completion of the disengagement of the frictional engagement element, when the temperature of the hydraulic fluid is lower than the third threshold value, and to increase the discharge speed of the hydraulic fluid of the first hydraulic chamber by the first discharge speed switching section, from the start of the switching from the running range to the neutral range to the completion of the disengagement of the frictional engagement element, when the temperature of the hydraulic fluid is lower than the second threshold value.

DETAILED DESCRIPTION OF THE INVENTION

Figure 1:
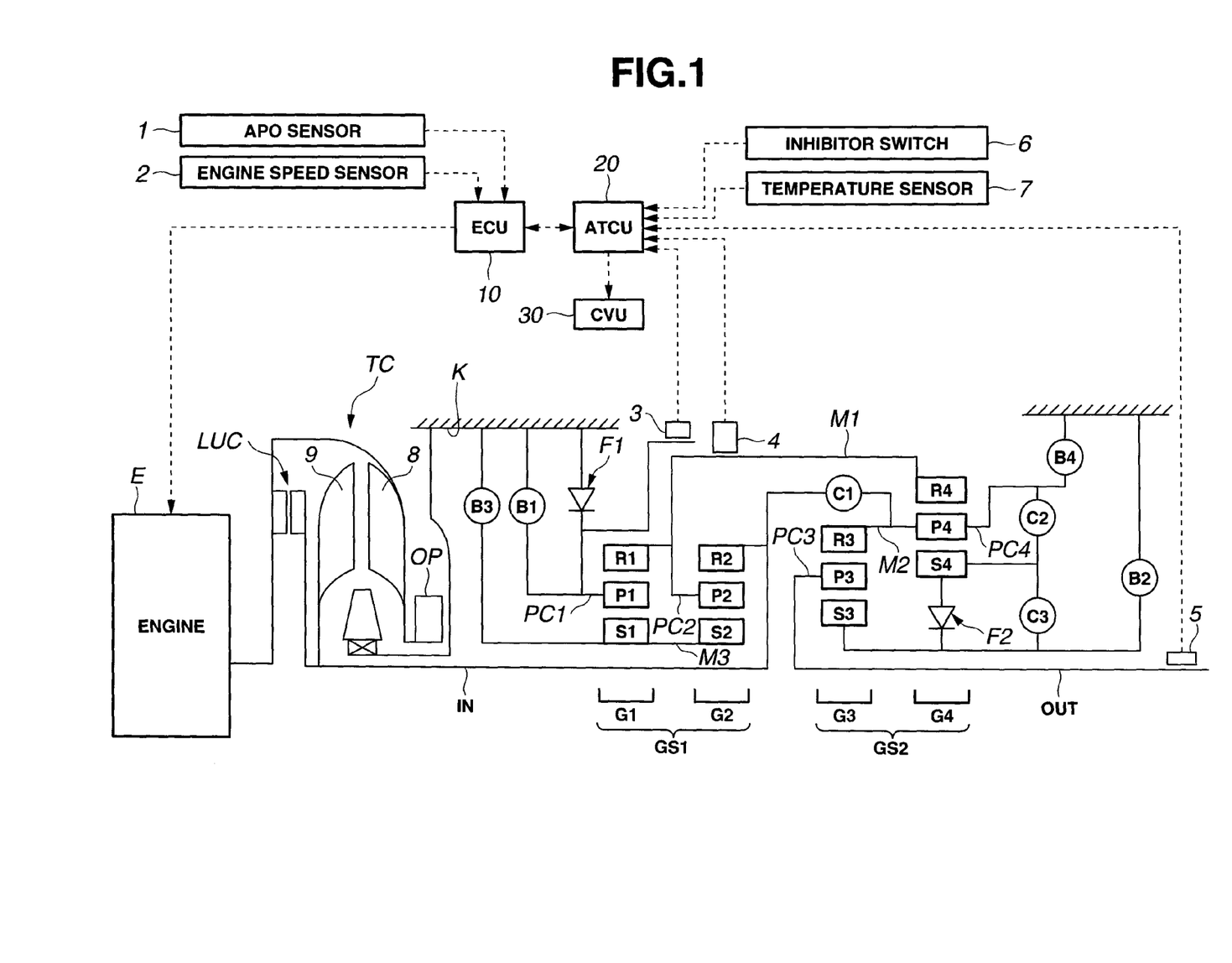
FIG. 1 is a skeleton diagram showing a drive train according to an embodiment of the present invention.

Hereinafter, an embodiment is illustrated in detail. FIG. 1 is a skeleton diagram showing a drive train of an automatic transmission according to the embodiment of the present invention. The automatic transmission receives a driving force of an engine E from an input shaft IN through a torque converter TC. The rotational speed is varied by four planetary gears and seven frictional engagement elements, and outputted from an output shaft OUT. Moreover, an oil pump OP is provided coaxially with a pump impeller 8 of torque converter TC, and driven by the driving force of engine E to pressurize the oil. Input shaft IN is connected with a turbine 9 of torque converter TC. LUC represents a lockup clutch.

Moreover, there are provided an engine controller (ECU) 10 configured to control a driving state of engine E, an automatic transmission controller (ATCU) 20 configured to control a shift state and so on of the automatic transmission, and a control valve unit (CVU) 30 configured to control hydraulic pressures of the frictional engagement elements based on output signals of automatic transmission controller 20. Engine controller 10 and automatic transmission controller 20 are connected with each other by can transmission lines and so on to commonly have sensor information and control information.

Engine controller 10 is connected with an APO sensor 1 arranged to sense an accelerator pedal operation quantity of a driver, and an engine speed sensor 2 arranged to sense an engine speed. Engine controller 10 is configured to control a fuel injection quantity and a throttle opening based on the engine speed and the accelerator pedal operation quantity, and to control the engine output, the rotational speed and the engine torque.

Automatic transmission controller 20 is connected with a first turbine rotational speed sensor 3 arranged to sense a rotational speed of a first career PC1, a second turbine rotational speed sensor 4 arranged to sense a rotational speed of a first ring gear R1, an output shaft rotational speed sensor 5 arranged to sense a rotational speed of output shaft OUT, a temperature sensor 7 arranged to sense a temperature of the hydraulic fluid (oil temperature), and an inhibitor switch 6 arranged to sense an operation state of a shift lever by the driver. A vehicle speed is calculated by the rotational speed of the output shaft OUT.

Automatic transmission controller 20 is configured to select, in D range, an appropriate command gear stage based on the vehicle speed and accelerator pedal operation quantity APO obtained through engine controller 10. Automatic transmission controller 20 is configured to determine timings of the engagements and the disengagements of the engagement elements based on the engine speed, the turbine rotational speed and so on, and to output, to control valve unit 30, a control command to attain the command gear stage. In the drive train according to the embodiment of the present invention, the rotational speed sensor can not directly confront the turbine of torque converter TC or input shaft IN. Therefore, the turbine rotational speed is determined based on the output of first turbine rotational speed sensor 3 and the output of second turbine rotational speed sensor 4.

A transmission mechanism between input shaft IN and output shaft OUT is illustrated below. From the input shaft IN's side to the output shaft OUT's side, there are provided a first planetary gear set GS1 and a second planetary gear set GS2. First planetary gear set GS1 includes a first planetary gear G1 and a second planetary gear G2. Second planetary gear set GS2 includes a third planetary gear G3 and a fourth planetary gear G4. Moreover, there are provided a plurality of clutches C1, C2 and C3, brakes B1, B2, B3 and B4, and one-way clutches F1 and F2 serving as frictional engagement elements described later.

First planetary gear G1 is a single pinion type planetary gear including a first sun gear S1, a first ring gear R1, a first pinion P1 arranged to engage with first sun gear S1 and first ring gear R1, and a first career PC1 supporting first pinion P1. Second planetary gear G2 is a single pinion type planetary gear including a second sun gear S2, a second ring gear R2, a second pinion P2 arranged to engage with second sun gear S2 and second ring gear R2, and a second career PC2 supporting second pinion P2. Third planetary gear G3 is a single pinion type planetary gear including a third sun gear S1, a third ring gear R3, a third pinion P3 arranged to engage with third sun gear S3 and third ring gear R3, and a third career PC3 supporting third pinion P3. Fourth planetary gear G4 is a single pinion type planetary gear including a fourth sun gear S4, a fourth ring gear R4, a fourth pinion P4 arranged to engage with fourth sun gear S4 and fourth ring gear R4, and a fourth career PC4 supporting forth pinion P4.

Input shaft IN is connected with second ring gear R2 to input the driving force (rotational force) from engine E through torque converter TC and so on to second ring gear R2. Output shaft OUT is connected with third career PC3 to transmit an output driving force (output rotational force) through a final gear (not shown) and so on to driving wheels.

A first connection member M1 connects first ring gear R1, fourth ring gear R4 and second career PC2. A second connection member M2 connects third ring gear R3 and fourth carrier PC4. A third connection member M3 connects first sun gear S1 and second sun gear S2. In first planetary gear set GS1, first planetary gear G1 and second planetary gear G2 are connected by first connection member M1 and third connection member M3. First planetary gear set GS1 is composed of four rotary members. Moreover, in second planetary gear set GS2, third planetary gear G3 and fourth planetary gear G4 are connected by second connection member M2. Second planetary gear set GS2 is composed of five rotary members.

In planetary gear set GS1, the input torque from input shaft IN is inputted to second ring gear R2. The converted torque is outputted from second carrier PC2 through first connection member M1 to second planetary gear set GS2. In planetary gear set GS2, the input torque from input shaft IN is inputted through input clutch C1 to second connection member M2, and through first connection member M1 to fourth ring gear R4. The converted output torque is outputted from third carrier PC3 to output shaft OUT. A direct clutch C2 is arranged to connect/disconnect between fourth sun gear S4 and fourth carrier PC4.

Between fourth sun gear S4 and third sun gear S3, there are provided an H&LR clutch C3 and a second one-way clutch F2 arranged in parallel with each other. Accordingly, when H&LR clutch C3 is disengaged and the rotational speed of fourth sun gear S4 is greater than the rotational speed of third sun gear S3, third sun gear S3 and fourth sun gear S4 generate independent rotational speeds. Therefore, third planetary gear G3 and fourth planetary gear G4 attain independent gear ratios.

Between first carrier PC1 and a transmission case K on the fixed side, there are provided a front brake B1 and a first one-way clutch F1 arranged in parallel with each other. Between third sun gear S3 and transmission case K, there is provided a low brake B2. Between first sun gear S1 and transmission case K, there is provided a 2346 brake B3. Moreover, between fourth carrier PC4 and transmission case K, there is provided a reverse brake B4.

Figure 2:
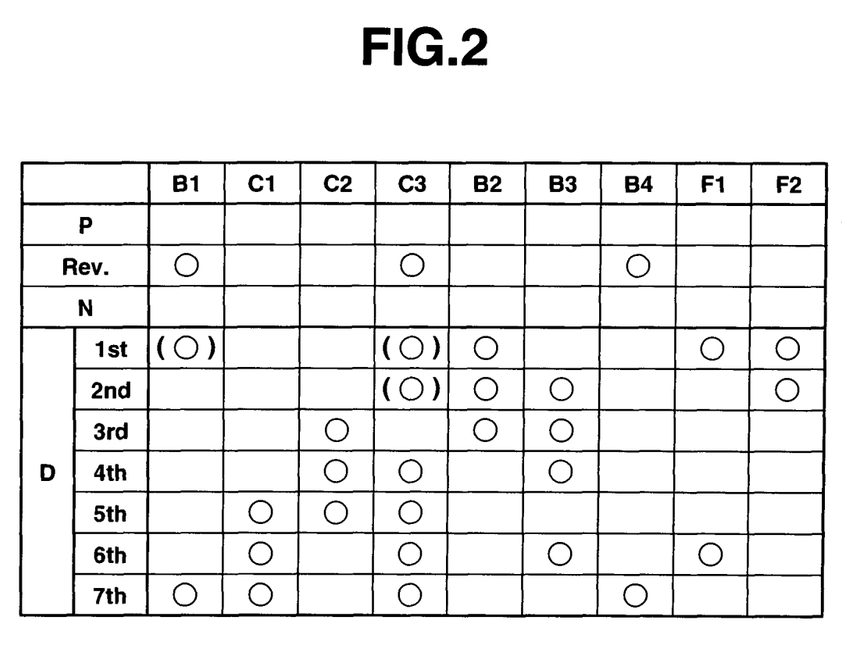
FIG. 2 is an engagement table showing engagement or disengagement of frictional engagement elements.

In the above-described transmission mechanism, it is possible to attain seven forward speeds (1st-7th) in the D range, and one reverse speed (Rev) by combination of the engagement and the disengagement of the engagement elements as shown in an engagement table shown in FIG. 2. P represents parking. In FIG. 2, ○ represents the engaged state of the engagement element. (○) represents the engaged state of the engagement element when a range in which the engine brake is acted is selected.

Figure 3:
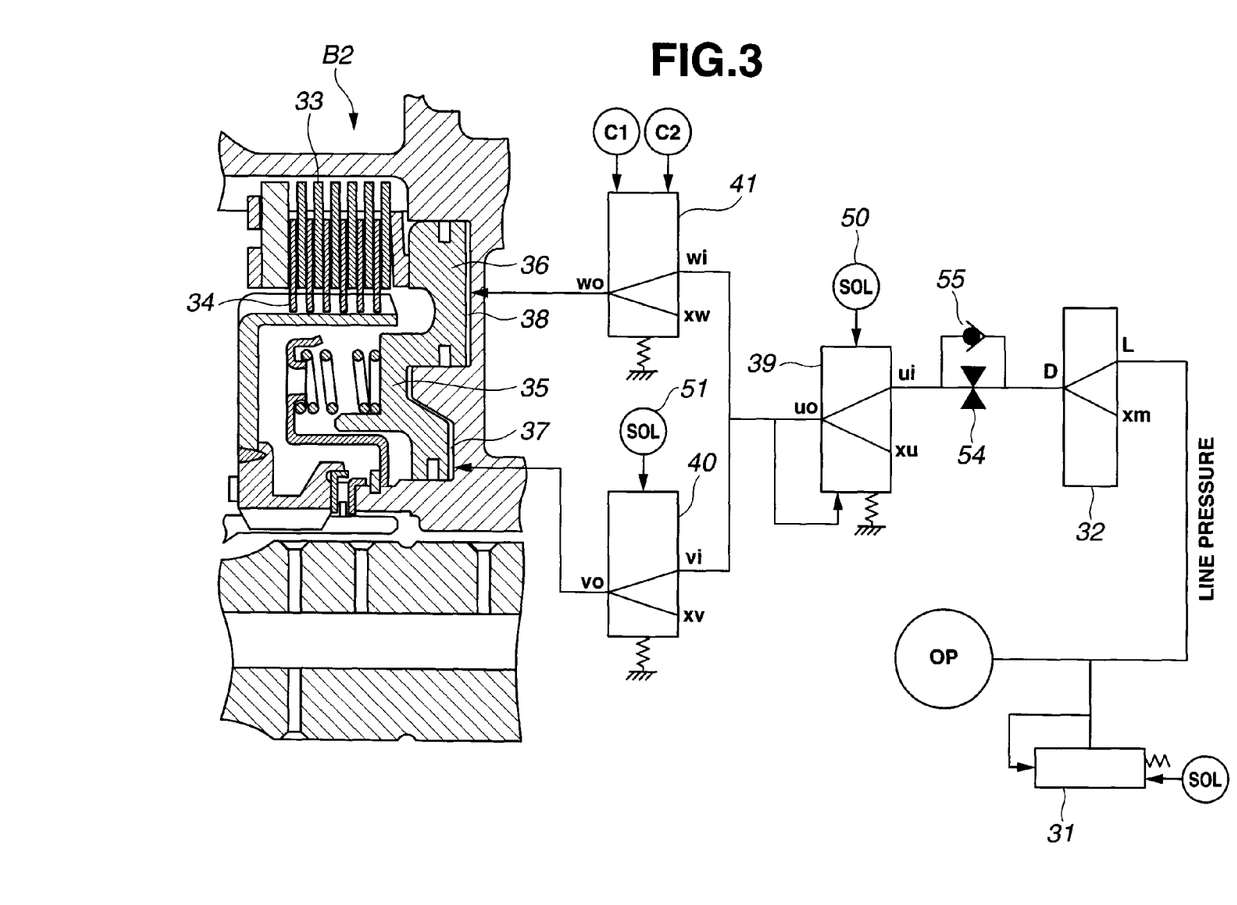
FIG. 3 is a view showing a circuit of a hydraulic pressure supplied to a low brake.

Low brake B2 is engaged only in the first-third speeds of the D range, and disengaged in a neutral (N) range. This hydraulic circuit of low brake B2 is illustrated below. FIG. 3 is a hydraulic circuit of the hydraulic pressure supplied to low brake B2 in the hydraulic circuit of control valve unit 30. Control valve unit 30 includes a pressure regulator valve 31 connected with oil pump OP, and a manual valve 32 arranged to switch the supply passages to the engagement elements. The discharge pressure of oil pump OP is adjusted in accordance with the opening degree of pressure regulator valve 31, and becomes a line pressure. The line pressure is supplied to the engagement elements in accordance with the hydraulic passages switched by manual valve 32.

In manual valve 32, an output port D to low brake B2 is connected with a line pressure input port L when the D range is selected as a running range, and connected with a drain port xm when the neutral (N) range is selected. In manual valve 32 of FIG. 3, ports relating to the D range are only shown.

The piston presses first frictional plates 33 and second frictional plates 34, so that low brake B2 is frictionally engaged. The piston includes a first piston 35 having a smaller pressure receiving area, and a second piston 36 having a larger pressure receiving area. The piston is integrally formed by first piston 35 and second piston 36. First piston 35 confronts a first hydraulic chamber 37. Second piston 36 confronts a second hydraulic chamber 38. First piston 35 and second piston 36 receive the hydraulic pressures independently. The sum of the product of the hydraulic pressure received by the first piston 35 and the pressure receiving area of first piston 35 and the product of the hydraulic pressure received by the second piston 36 and the pressure receiving area of second piston 36 is the urging force of the entire piston, and the engagement capacity.

In the hydraulic circuit of low brake B2, output port D of manual valve 32 is connected through an orifice 54 and an unidirectional valve (one-way valve) 55 which are arranged in parallel with each other, to an input port ui of pressure regulating valve 39. An output port uo of pressure regulating valve 39 is connected with an input port vi of a first switching valve 40 arranged to open and close a hydraulic pressure supply passage to first hydraulic chamber 37. Moreover, output port uo of pressure regulating valve 39 is connected with an input port wi of a second switching valve 41 arranged to open and close a hydraulic pressure supply passage to second hydraulic chamber 38. Pressure regulating valve 39 includes a first end receiving a solenoid pressure from a solenoid 50, and a second end receiving a spring force and a feedback pressure which is an output. With this, pressure regulating valve 39 adjusts the line pressure from manual valve 32, and outputs a low brake hydraulic pressure to output port uo.

First switching valve 40 is switched, by an ON/OFF solenoid 51, between a first position in which input port vi on the pressure regulating valve 39's side and an output port vo on the first hydraulic chamber 37's side are connected, and a second position in which input port vi and output port vo are disconnected. That is, first switching valve 40 is positioned in the first position by the ON state of ON/OFF solenoid 51, and positioned in the second position by the OFF state of ON/OFF solenoid 51. In the second position, first switching valve 40 connects output port vo to a drain port xv to discharge the hydraulic fluid of first hydraulic chamber 37.

Second switching valve 41 is operated by using supply pressures to input clutch C1 and direct clutch C2, as a signal pressure. That is, when the hydraulic pressure is not supplied to input clutch C1 and direct clutch C2, second switching valve 41 is positioned in a first position in which input port wi on the pressure regulating valve 39's side and an output port wo on the second hydraulic pressure chamber 38's side are connected. When the hydraulic pressure is supplied to input clutch C1 and direct clutch C2, second switching valve 41 is in a second position in which input port wi and output port wo are disconnected. In the second position, second switching valve 41 connects output port wo to a drain port xw to discharge the hydraulic fluid of second hydraulic chamber 38.

The low brake hydraulic fluid is not supplied when both of first switching valve 40 and second switching vale 41 are in the second positions. The low brake hydraulic fluid is supplied to first hydraulic chamber 37 and second hydraulic chamber 38 when both of first switching valve 40 and second switching valve 41 are in the first positions. As shown in the engagement table of FIG. 2, low brake B2 is engaged in the D range only in first to third speeds. In the first and second speeds, the shared torque is large. Accordingly, it is necessary to provide the larger engagement capacity between the first frictional plates and the second frictional plates. Therefore, first switching valve 40 and second switching valve 41 are in the first positions. On the other hand, in the third speed, the shared torque is relatively small. Accordingly, it is unnecessary to provide the large engagement capacity between the first frictional plates and the second frictional plates. Therefore, the controller is configured to control only first switching valve 40 to be in the first position, and to control second switching valve 41 to be in the second position.

It is assumed that the operation from the D range to the N range starts in a state in which the vehicle stops and the gear stage is in the first speed in the embodiment according to the present invention. Accordingly, first switching valve 40 and second switching valve 41 are in the first positions immediately (just) before the operation from the D range to the N range.

Figure 4:
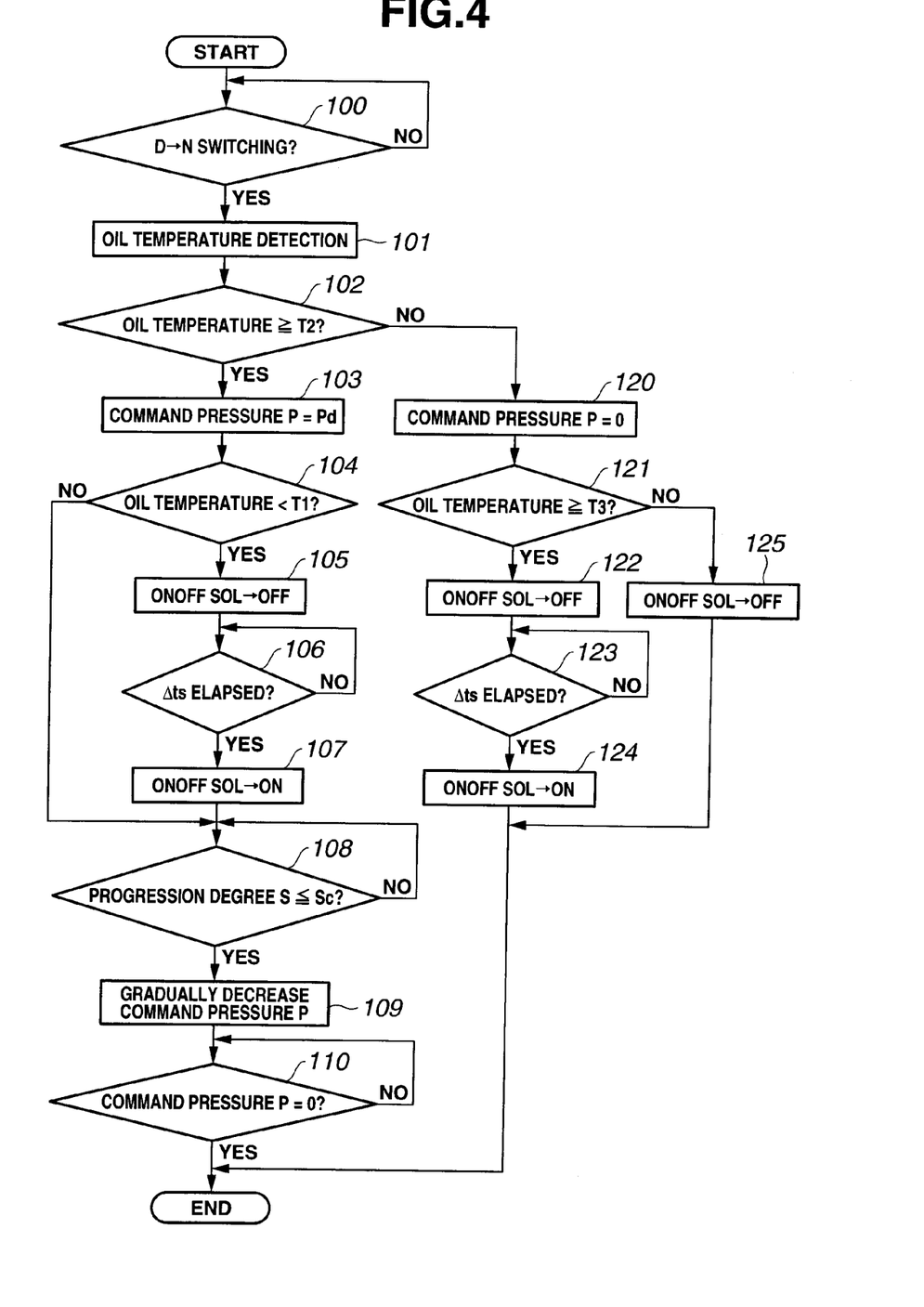
FIG. 4 is a flowchart showing a process of a hydraulic fluid discharging control.

A hydraulic fluid discharging control at the switching from the D range to the N range is illustrated below in the above-mentioned hydraulic circuit of low brake B2. FIG. 4 is a flowchart showing the hydraulic fluid discharging control process performed by automatic transmission controller 20. In consideration of the viscosity of the hydraulic fluid, the control is performed by dividing the temperature of the hydraulic fluid into four regions (an ordinary temperature, a low temperature, an extremely low temperature, and a very extremely low temperature). The ordinary temperature region and the low temperature region are divided by temperature T1. The low temperature region and the extremely low temperature region are divided by temperature T2. The extremely low temperature region and the very extremely low temperature region are divided by temperature T3.

At step S100, the controller is configured to check or judge whether or not the shift lever is switched from the D range to the N range (D→N switching), based on the signal from inhibitor switch 6. When the answer of step S100 is affirmative (YES), the process proceeds to step S101. When the answer of step S100 is negative (NO), the process repeats step S100. Output port D of manual valve 32 is connected with drain port xm by the switching from the D range to N range, and the hydraulic fluid starts to be discharged from manual valve 32 through orifice 54.

At step S101, the controller is configured to sense the oil temperature. At step S102, the controller is configured to judge whether or not the oil temperature is equal to or higher than T2 (oil temperature≧T2). When the answer of step S102 is YES, the process proceeds to step S103. When the answer of step S102 is NO, the process proceeds to step S120. At step S103, the controller is configured to set a command pressure P to a predetermined intermediate value Pd which is not zero, and which is smaller than a maximum pressure, so as to control the low brake hydraulic fluid pressure, and to output a driving command corresponding to command pressure P to solenoid 50 of pressure regulating valve 39 (this driving command is simply referred to as command of the command pressure to the solenoid). In the D range, command pressure P is a maximum value Max. At step S103, command pressure P is set equal to or lower than intermediate Value Pd. Accordingly, the hydraulic fluid is also discharged from drain port xu of pressure regulating valve 39.

At step S104, the controller is configured to judge whether or not the oil temperature is lower than T1 (oil temperature<T1). When the answer of step S104 is YES (the oil temperature is in the low temperature region), the process proceeds to step S105. When the answer of step S104 is NO (the oil temperature is in the ordinary temperature region), the process proceeds to step S108. At step S105, the controller is configured to turn ON/OFF solenoid 51 off. Accordingly, first switching valve 40 is in the second position, and the hydraulic fluid is discharged from first hydraulic chamber 37 of low brake B2.

At step S106, the controller is configured to count an elapsed time period from a time at which ON/OFF solenoid 51 is turned off, and to judge whether or not a predetermined time period Δts has elapsed. When the answer of step S106 is YES, the process proceeds to step S107. When the answer of step S106 is NO, the process repeats step S106. At step S107, the controller is configured to turn ON/OFF solenoid 51 on. Consequently, first switching valve 40 is in the first position, and the hydraulic fluid of first hydraulic chamber 37 flows to pressure regulating valve 39 again. Subsequently to step S107, the process proceeds to step S108.

At step S108, the controller is configured to judge whether or not a progression degree S of the disengagement of low brake B2 is equal to or smaller than a predetermined threshold value Sc. In this case, the progression degree S is represented as follows:

$$S=(Ne-Nt)/(Ne-No \times \text{gear ratio}) \times 100$$

where Ne is the engine speed, Nt is the turbine rotational speed, and No is the output shaft rotational speed. The progression degree of the disengagement is identical to a progression degree of the shift. Nt approaches Ne as the disengagement progresses. Accordingly, S becomes a small value (%).

The process repeats step S108 until the progression degree S reaches the predetermined threshold value Sc, for example 30%, and then proceeds to step S109. At step S109, the controller is configured to gradually decrease command pressure P from Pd. The gradient of the gradual decrease is set so that command pressure P becomes zero after a predetermined target time period Δtp. Subsequently to step S109, the process proceeds to step S110. At step S110, the controller is configured to judge whether or not command pressure P is zero. When the answer of step S110 is YES, the process is finished. When the answer of step S110 is NO, the process repeats step S110.

Subsequently to the negative answer of step S102 (the oil temperature is lower than T2), at step S120, the controller is configured to set command pressure P to zero. Subsequently to step S120, the process proceeds to step S121. At step S121, the controller is configured to judge whether or not the oil temperature is equal to or higher than T3. When the answer of step S121 is YES (the oil temperature is in the extremely low temperature region), the process proceeds to step S122. When the answer of step S121 is NO (the oil temperature is in the very extremely low temperature region), the process proceeds to step S125.

At step S122, the controller is configured to turn ON/OFF solenoid 51 off, so that first switching valve 40 is in the second position. Subsequently to step S122, at step S123, the controller is configured to judge whether or not the time period Δts has elapsed from a time at which ON/OFF solenoid 5 is turned off. When the answer of step S123 is YES, the process proceeds to step S124. When the answer of step S123 is NO, the process repeats step S123. At step S124, the controller is configured to turn ON/OFF solenoid 51 on, so that first switching valve 40 is in the first position. In this state, the discharging control is finished. The operations at steps S122-S124 are identical, respectively, to the operations at steps S105-S107.

Subsequently to the negative answer of step S121 (the oil temperature is lower than T3), at step S125, the controller is configured to turn ON/OFF solenoid 51 off, so that first switching valve 40 is in the second position. In this state, the process is finished.

Figure 5:
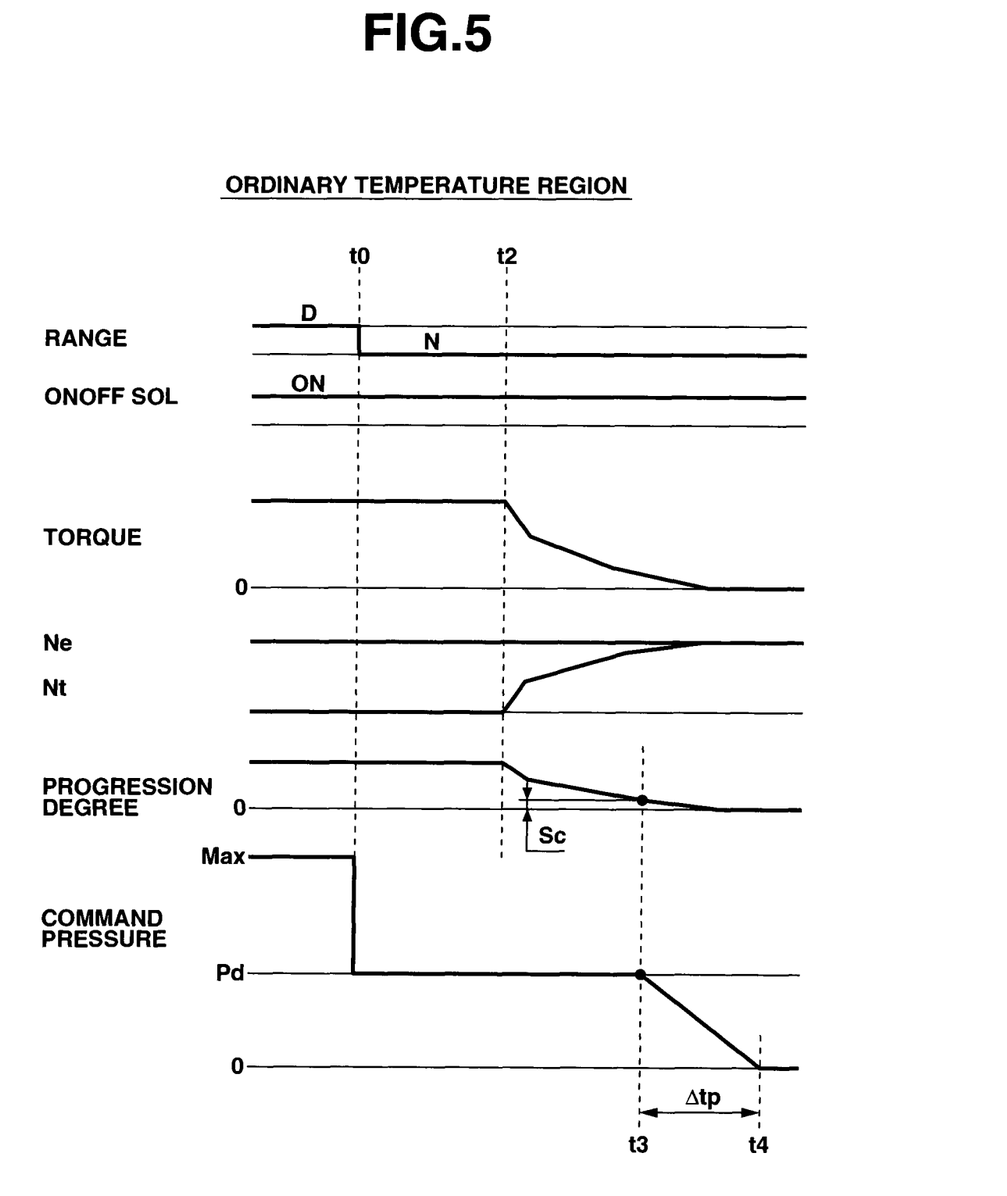
FIG. 5 is a time chart showing variations of parameters in an ordinary temperature region.

FIG. 5 shows variations of the parameters by the above-mentioned control in the ordinary temperature region in which the oil temperature is equal to or higher than T1 (oil temperature≧T1). At time t0 at which the range is switched from the D range to the N range, command pressure P is decreased from maximum value Max to intermediate value Pd. Accordingly, parts of the hydraulic fluids of first hydraulic chamber 37 and second hydraulic chamber 38 are discharged from drain port xu of pressure regulating valve 39, respectively, through first switching valve 40 and second switching valve 41. The residual of the hydraulic fluids of first hydraulic chamber 37 and second hydraulic chamber 38 are discharged from drain port xm of manual valve 32 through orifice 54. The discharge of the hydraulic fluid means the release of the hydraulic fluid pressure.

At time t2, first frictional plates 33 and second frictional plates 34 of low brake B2 slip each other to enter a substantial disengagement process. In this disengagement process, the release (reduction) of the transmission torque starts, and the turbine rotational speed Nt which was depart from engine speed Ne toward the low speed side starts to increase. Progression degree S decreases in accordance with the variation of turbine rotational speed Nt. Then, at time t3 at which progression degree S reaches threshold value Sc, command pressure P starts to gradually decrease. At time t4 after target time period Δtp, command pressure P becomes zero.

Figure 6:
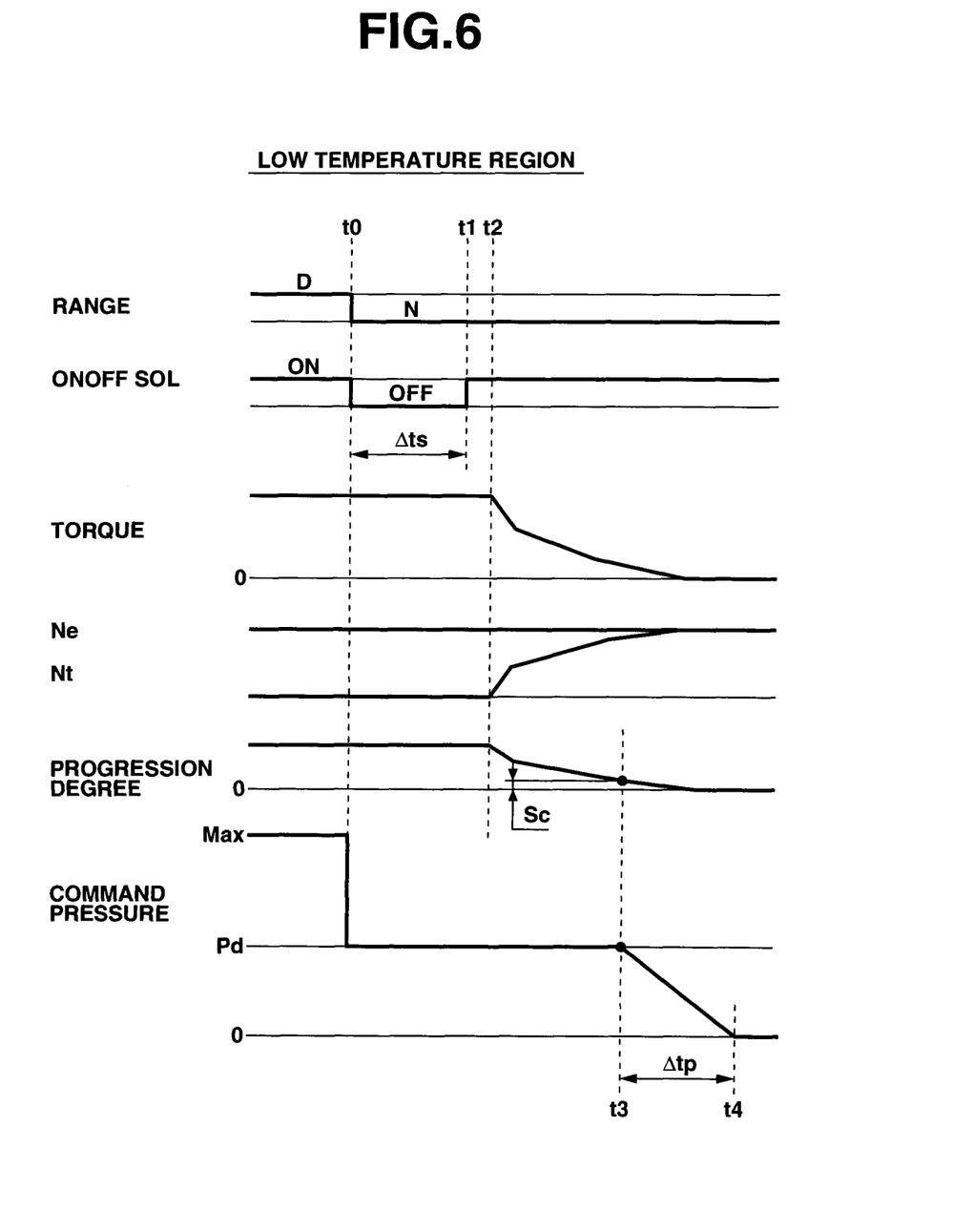
FIG. 6 is a time chart showing variations of parameters in a low temperature region.

FIG. 6 shows variations of the parameters in the low temperature region in which the oil temperature is lower than T1, and is equal to or higher than T2 (T2≦oil temperature<T1). At time t0 at which the range is switched from the D range to the N range, command pressure P is decreased to intermediate value Pd, and at the same time ON/OFF solenoid (OnOffSol) 51 is turned off, unlike the ordinary temperature region. Accordingly, first switching valve 40 is in the second position, the hydraulic fluid of first hydraulic chamber 37 is rapidly discharged from drain port xv of first switching valve 40 before the hydraulic fluid of first hydraulic chamber 37 reaches pressure regulating valve 39. Time period Δts (t0-t1) during which ON/OFF solenoid 51 is turned off is set shorter than the time period (time t2) at which low brake B2 enters the substantial disengagement process in the ordinary temperature region.

Accordingly, even when the hydraulic fluid is high viscosity for the low temperature, the discharge speed of the hydraulic fluid is increased as the entirety of low brake B2. Therefore, it is possible to suppress the delay of time t2 at which low brake B2 enters the substantial disengagement process. Moreover, at time t2 at which the variation of the torque is generated, the discharge speed is returned to the discharge speed controlled by pressure regulating valve 39 and orifice 54. Accordingly, it is possible to prevent the generation of the shock. The effective pressure receiving area of first piston 35 is smaller than the effective pressure receiving area of second piston 36. Accordingly, the transmission torque is small, and the influences of the individual difference and the variation with time are small. Therefore, it is unnecessary to perform the learning control of the time period during which ON/OFF solenoid 51 is turned off. Δts is set to the constant time period.

Figure 7:
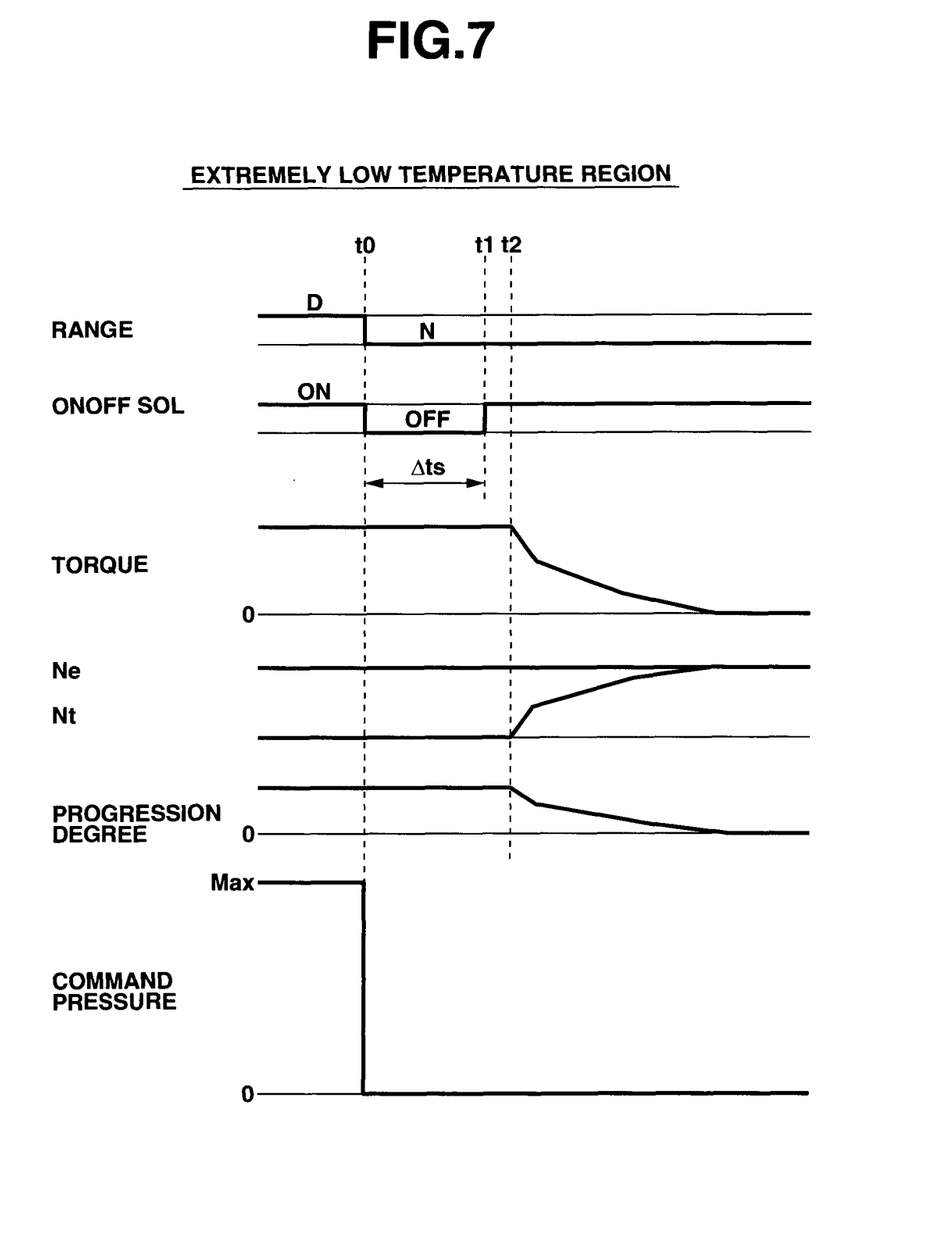
FIG. 7 is a time chart showing variations of parameters in an extremely low temperature region.

FIG. 7 shows variations of the parameters in the extremely low temperature in which the oil temperature is lower than T2, and equal to or higher than T3 (T3≦oil temperature<T2). In the extremely low temperature region, at time t0 at which the range is switched from the D range to the N range, command pressure P is not decreased to the intermediate value, and is decreased to zero, unlike the low temperature region. Consequently, pressure regulating valve 39 completely connects outlet port uo and drain port xu. Accordingly, all of the hydraulic fluids of first hydraulic chamber 37 and second hydraulic chamber 38 is discharged from drain port xu of pressure regulating valve 39 before the hydraulic fluids of first hydraulic chamber 37 and second hydraulic chamber 38 reach manual valve 32.

ON/OFF solenoid 51 is turned off during the constant time period Δts, like the low temperature region. Accordingly, the hydraulic fluid of first hydraulic chamber 37 is rapidly discharged from drain port xv of first switching valve 40 during the constant time period Δts. Accordingly, in this extremely low temperature region, the discharge of the hydraulic fluid is not restricted in orifice 54, so that the discharge resistance is low, relative to the low temperature region. Therefore, it is possible to prevent the generation of the shock, and to suppress the delay of time t2 at which low brake B2 enters the substantial disengagement process, although the oil temperature is lower than the temperature in the low temperature region.

Figure 8:
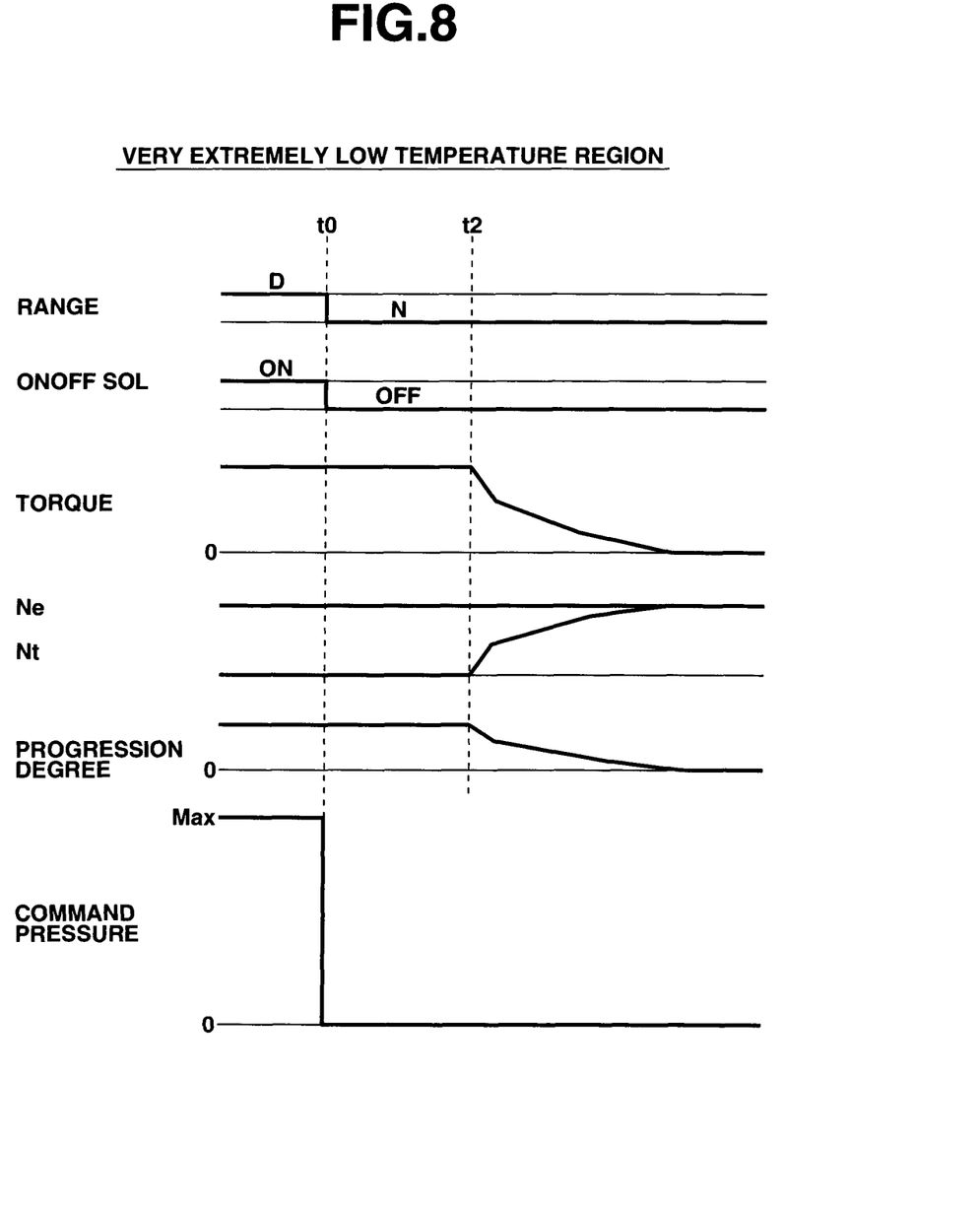
FIG. 8 is a time chart showing variations of parameters in a very extremely low temperature region.

FIG. 8 shows variations of the parameters in the very extremely low temperature region in which the oil temperature is lower than T3 (oil temperature<T3). In this case, at time t0 at which the range is switched from the D range to the N range, ON/OFF solenoid 51 is turned off. ON/OFF solenoid 51 is not turned on after the constant time period Δts, and held in the off state until the completion of the disengagement of low brake B2, unlike the extremely low temperature region. In the very extremely low temperature region, the viscosity of the hydraulic fluid is extremely high. In this embodiment, the rapid discharge of the hydraulic fluid of first hydraulic chamber 37 continues by first switching valve 40, and accordingly it is possible to suppress the delay of the discharge.

In this example, low brake B2 corresponds to the frictional engagement element. First frictional plates 33 and second frictional plates 34 correspond to frictional plates. First switching valve 40 arranged to be switched between the first position and the second position, and to discharge the hydraulic fluid from drain port xv corresponds to a first discharge speed switching section. Pressure regulating valve 39 arranged to receive the control command of command pressure P, and to discharge the hydraulic fluid from drain port xu corresponds to a second discharge speed switching section. Processes (Operations) of the flowchart shown in FIG. 4, and performed in automatic transmission controller 20 corresponds to a control section. Oil temperature T1 corresponds to a first threshold value. Oil temperature T3 corresponds to a second threshold value. Δts corresponds to a predetermined time period from the start of the switching from the running range to the neutral range, to the start of the release (reduction) of the transmission torque.

The automatic transmission according to the embodiment of the present invention includes a low brake B2 arranged to be switched from an engagement state to a disengagement state at a switching from a running range (D) to a neutral range (N), the low brake B2 including: frictional plates (33, 34); a first piston 35 arranged to push the frictional plates (33,34); a second piston 36 arranged to push the frictional plates (33,34); a first hydraulic chamber 37 arranged to receive a hydraulic fluid for pushing the first piston 35; and a second hydraulic chamber 38 arranged to receive a hydraulic fluid for pushing the second piston 36; a first discharge speed switching section 40 arranged to switch only a discharge speed of the hydraulic fluid of the first hydraulic chamber 37 by being switched between the first position and the second position by ON/OFF solenoid 51; and a control unit 20 configured to increase the discharge speed of the hydraulic fluid of the first hydraulic chamber 37 during a predetermined time period by switching the first discharge speed switching section 40 to the second position at the switching from the running range (D) to the neutral range (N). Accordingly, it is possible to increase the speed of the disengagement of low brake B2. Moreover, the discharge speed of the hydraulic fluid of only one of the two hydraulic chambers is varied. Consequently, the influence on the entirety of the hydraulic fluid is small. Therefore, it is possible to suppress the generation of the shock by the rapid disengagement even when the learning control is not performed and the predetermined time period is schematically set.

In the automatic transmission according to the embodiment of the present invention, the control section 20 is configured to increase the discharge speed of the hydraulic fluid of the first hydraulic chamber 37 during the predetermined time period from the start of the switching from the running range (D) to the neutral range (N), by switching the first discharge speed switching section 40 to the second position, when a temperature of the hydraulic fluid is lower than a first threshold value T1 dividing the ordinary temperature region and the low temperature region. Accordingly, it is possible to rapidly discharge the hydraulic fluid in a short time in the low temperature region in which the viscosity of the hydraulic fluid is high, and to rapidly disengage low brake B2. Moreover, the predetermined time period to increase the discharge speed of the hydraulic fluid of first hydraulic chamber 37 is a time period Δts from a start of the switching from the running range (D) to the neutral range (N), to a time before a start of a release of a transmission torque when the temperature is equal to or higher than the second threshold value, and lower than the first threshold value. Furthermore, the predetermined time period is a time period Δts from the start of the switching from the running range (D) to the neutral range (N), to a completion of the disengagement of the low brake B2 when the temperature of the hydraulic fluid is lower than the second threshold value T3. Accordingly, it is possible to rapidly discharge the hydraulic fluid in a short time in the very extremely temperature region in which the viscosity of the hydraulic fluid is extremely high, and to rapidly disengage low brake B2.

Moreover, the automatic transmission includes the pressure regulating valve (second discharge speed switching section) connected through first switching valve 40 and second switching valve 41 to the first hydraulic chamber 37 and the second hydraulic chamber 38, and arranged to discharge the hydraulic fluid of the first hydraulic chamber 37 and the hydraulic fluid of the second hydraulic chamber 38 from drain port xu in accordance with command pressure P. Control section 20 is configured:

(1) to set the command pressure to intermediate value Pd from a start of the switching from the running range (D) to the neutral range (N) to a time t3 at which a shift progression degree reaches a predetermined shift progression degree (Sc), when a temperature of the hydraulic fluid is equal to or higher than a third threshold value T2, so as to discharge parts of the hydraulic fluid of the first hydraulic chamber 37 and the hydraulic fluid of the second hydraulic chamber 38 before the hydraulic fluid is discharged from manual valve 32 after passing through orifice 54, and thereby to increase, to a first level, the discharge speed of the hydraulic fluid of the first hydraulic chamber 37 and the discharge speed of the hydraulic fluid of the second hydraulic chamber 38, (2) to switch first switching valve 40 to the second position during a time period Δts from the start of the switching from the running range (D) to the neutral range (N) to a time before a start of a release of a transmission torque when the temperature of the hydraulic fluid is equal to or higher than a second threshold value T3 lower than the third threshold value T2, and lower than a first threshold value T1 higher than the third threshold value T2, and thereby to increase the discharge speed of the hydraulic fluid of the first hydraulic chamber 37, (3) to set the command pressure to zero from the start of the switching from the running range (D) to the neutral range (N) to a completion of the disengagement of the low brake B2, when the temperature of the hydraulic fluid is lower than the third threshold value T2, so as to discharge all of the hydraulic fluid of the first hydraulic chamber 37 and the hydraulic fluid of the second hydraulic chamber 38 by the first and second switching valves 40 and 41 and the pressure regulating valve 39, and thereby to increase, to a second level higher than the first level, the discharge speed of the hydraulic fluid of the first hydraulic chamber 37 and the discharge speed of the hydraulic fluid of the second hydraulic chamber 38, and (4) to switch first switching valve 40 to the second position from the start of the switching from the running range (D) to the neutral range (N) to the completion of the disengagement of the low brake B2 when the temperature of the hydraulic fluid is lower than the second threshold value T3, and thereby to increase the discharge speed of the hydraulic fluid of the first hydraulic chamber 37. Accordingly, it is possible to increase the level of the discharge speed in accordance with the change from the ordinary temperature region to the very extremely low temperature region of the oil temperature, and to ensure the response of the disengagement of low brake B2 and the prevention of the shock in accordance with the variation of the viscosity of the hydraulic fluid.

In the automatic transmission according to the embodiment of the present invention, the first piston 35 has a pressure receiving area smaller than a pressure receiving area of the second piston 36. Accordingly, the influences of the individual difference and the variation with time are small. Therefore, it is possible to prolong time period Δts during which ON/OFF solenoid 51 is turned off, to a time immediately before the start of the substantial disengagement process of low brake B2.

In this embodiment, in the low temperature region and the extremely low temperature region, the controller is configured to increase the speed of the discharge of the hydraulic fluid of the first hydraulic chamber. This is not limited to the low temperature region. Moreover, in the ordinary temperature region, the controller may be configured to increase the speed of the discharge of the hydraulic fluid of the first hydraulic chamber. Moreover, in this embodiment, orifice 54 is bypassed so that the hydraulic fluid is discharged by pressure regulating valve 39 so as to increase the discharge speed of the hydraulic fluid of second hydraulic chamber 38 (first hydraulic chamber 37 in accordance with the temperature region). However, orifice 54 is not limited to this. For example, there may be provided two or more throttles having a large size and a small size, as orifice 54. One of the throttles may be selected.

Moreover, in this embodiment, command pressure P of pressure regulating valve 39 is set by two levels in accordance with the ordinary temperature region and the low temperature region in which the oil temperature is equal to or higher than T2, or the extremely low temperature region and the very extremely low temperature region in which the oil temperature is lower than T2. However, command pressure P of pressure regulating valve 39 may be set in each of the ordinary temperature region, the low temperature region, the extremely low temperature region, and the very extremely low temperature region. Moreover, in this embodiment, intermediate value Pd is gradually decreased when the shift progression degree becomes equal to or smaller than constant threshold value Sc. However, the threshold value may be set larger as the oil temperature is lower.

In this embodiment, the disengagement control of low brake B2 engaged in the low speed stages (1st-3rd) of the D range is shown. However, the running range is not limited to the D range. The present invention is applicable to a disengagement control of the frictional engagement element engaged in the R range (reverse range, Rev), at the switching from the R range to the neutral range N. Moreover, this embodiment shows the disengagement control in which the operation from the D range to the N range is performed in the state in which the gear stage is the first speed when the vehicle stops. However, the present invention is applicable to the disengagement control in which the operation from the D range to the N range is performed in a state in which the gear stage is the second speed when the vehicle stops.

The entire contents of Japanese Patent Application No. 2008-156224 filed Jun. 16, 2008 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission comprising:
a frictional engagement element arranged to be switched from an engagement state to a disengagement state at a switching from a running range to a neutral range, the frictional engagement element including:
frictional plates;
a first piston arranged to push the frictional plates;
a second piston arranged to push the frictional plates;
a first hydraulic chamber arranged to receive a hydraulic fluid for pushing the first piston; and
a second hydraulic chamber arranged to receive a hydraulic fluid for pushing the second piston;
a first discharge speed switching section arranged to switch only a discharge speed of the hydraulic fluid of the first hydraulic chamber; and
a control section configured to increase the discharge speed of the hydraulic fluid of the first hydraulic chamber during a predetermined time period by the first discharge speed switching section at the switching from the running range to the neutral range.

2. The automatic transmission as claimed in claim 1, wherein the control section is configured to increase the discharge speed of the hydraulic fluid of the first hydraulic chamber during the predetermined time period by the first discharge speed switching section at the switching from the running range to the neutral range when a temperature of the hydraulic fluid is lower than a first threshold value.

3. The automatic transmission as claimed in claim 2, wherein the predetermined time period is a time period from a start of the switching from the running range to the neutral range, to a time before a start of a release of a transmission torque when the temperature is equal to or higher than a second threshold value lower than the first threshold value, and lower than the first threshold value; and the predetermined time period is a time period from the start of the switching from the running range to the neutral range, to a completion of the disengagement of the frictional engagement element when the temperature of the hydraulic fluid is lower than the second threshold value.

4. The automatic transmission as claimed in claim 3, wherein the first threshold value is a temperature dividing between an ordinary temperature region and a low temperature region; and the second threshold value is a temperature dividing between an extremely low temperature region having a temperature lower than a temperature of the low temperature region, and a very extremely low temperature region having a temperature lower than the temperature of the extremely low temperature region.

5. The automatic transmission as claimed in claim 1, wherein the first piston has a pressure receiving area smaller than a pressure receiving area of the second piston.

6. An automatic transmission comprising:
a frictional engagement element arranged to be switched from an engagement state to a disengagement state at a switching from a running range to a neutral range, the frictional engagement element including:
frictional plates;
a first piston arranged to push the frictional plates;
a second piston arranged to push the frictional plates;
a first hydraulic chamber arranged to receive a hydraulic fluid for pushing the first piston; and
a second hydraulic chamber arranged to receive a hydraulic fluid for pushing the second piston;
a first discharge speed switching section arranged to switch only a discharge speed of the hydraulic fluid of the first hydraulic chamber;
a second discharge speed switching section arranged to switch the discharge speed of the hydraulic fluid of the first hydraulic chamber and a discharge speed of the hydraulic fluid of the second hydraulic chamber; and
a control section configured
to control the discharge speed of the hydraulic fluid,
to increase, to a first level, the discharge speed of the hydraulic fluid of the first hydraulic chamber and the discharge speed of the hydraulic fluid of the second hydraulic chamber by the second discharge speed switching section, from a start of the switching from the running range to the neutral range to a time at which a shift progression degree reaches a predetermined shift progression degree, when a temperature of the hydraulic fluid is equal to or higher than a third threshold value,
to increase the discharge speed of the hydraulic fluid of the first hydraulic chamber by the first discharge speed switching section, during a predetermined time period from the start of the switching from the running range to the neutral range to a time before a start of a release of a transmission torque, when the temperature of the hydraulic fluid is equal to or higher than a second threshold value lower than the third threshold value, and lower than a first threshold value higher than the third threshold value,
to increase, to a second level higher than the first level, the discharge speed of the hydraulic fluid of the first hydraulic chamber and the discharge speed of the hydraulic fluid of the second hydraulic chamber by the second discharge speed switching section, from the start of the switching from the running range to the neutral range to a completion of the disengagement of the frictional engagement element, when the temperature of the hydraulic fluid is lower than the third threshold value, and
to increase the discharge speed of the hydraulic fluid of the first hydraulic chamber by the first discharge speed switching section, from the start of the switching from the running range to the neutral range to the completion of the disengagement of the frictional engagement element, when the temperature of the hydraulic fluid is lower than the second threshold value.

7. The automatic transmission as claimed in claim 6, wherein the first threshold value is a temperature dividing between an ordinary temperature region and a low temperature region; the third threshold value is a temperature dividing between the low temperature region and an extremely low temperature region; and the second threshold value is a temperature dividing between the extremely low temperature region and a very extremely low temperature region having a temperature lower than a temperature of the extremely low temperature region.

8. The automatic transmission as claimed in claim 6, wherein the first piston has a pressure receiving area smaller than a pressure receiving area of the second piston.

\* \* \* \* \*